United States Patent [19]
Johns

[11] Patent Number: 4,769,118
[45] Date of Patent: Sep. 6, 1988

[54] PROCESS FOR THE CURVILINEAR FORMATION OF HOLES

[75] Inventor: Antony Johns, Guiseley, England

[73] Assignee: AE PLC, Rugby, England

[21] Appl. No.: 95,571

[22] PCT Filed: Dec. 9, 1986

[86] PCT No.: PCT/GB86/00751
  § 371 Date: Jul. 13, 1987
  § 102(e) Date: Jul. 13, 1987

[87] PCT Pub. No.: WO87/03522
  PCT Pub. Date: Jun. 18, 1987

[30] Foreign Application Priority Data
Dec. 13, 1985 [GB] United Kingdom ............... 8530773

[51] Int. Cl.⁴ ........................... B23H 3/04; B23H 9/14
[52] U.S. Cl. ........................... 204/129.55; 204/224 M; 204/225
[58] Field of Search ............... 204/129.55, 224 M, 225

[56] References Cited

U.S. PATENT DOCUMENTS

| | | | |
|---|---|---|---|
| 3,041,442 | 6/1962 | Ullmann et al. | 204/224 M UX |
| 3,306,838 | 2/1967 | Johnson | 204/129.55 X |
| 3,384,567 | 5/1968 | Andrews et al. | 204/129.55 X |
| 3,719,569 | 3/1973 | Gosger | 204/224 M X |
| 3,801,489 | 4/1974 | Samson | 204/129.55 X |
| 3,875,038 | 4/1975 | McKinney et al. | 204/224 M |
| 4,104,503 | 8/1978 | Di Piazza et al. | 204/129.55 X |

FOREIGN PATENT DOCUMENTS

| | | |
|---|---|---|
| 133162 | 10/1901 | Fed. Rep. of Germany . |
| 2236242 | 2/1974 | Fed. Rep. of Germany . |
| 1188527 | 9/1959 | France . |
| 4419363 | 8/1969 | Japan ............... 204/129.55 |
| 846279 | 8/1960 | United Kingdom . |

Primary Examiner—Donald R. Valentine
Attorney, Agent, or Firm—William R. Hinds

[57] ABSTRACT

A process is described for the production of holes having curvilinear paths in engineering components. The process comprises the steps of producing relative motion along a curvilinear path between a workpiece in which it is desired to form a curved hole and a drill bit wherein the drill bit comprises a curved delivery tube of an ECM apparatus, the curved tube passing through an aperture in a guidance member which is positioned adjacent the workpiece, the aperture length being less than the diameter of the tube. An example is described of the production of curved holes in a gas turbine engine blade.

6 Claims, 2 Drawing Sheets

PROCESS FOR THE CURVILINEAR FORMATION OF HOLES

The present invention relates to a process for the formation of curvilinear holes in engineering components.

Some engineering components require the formation therein of very fine bore holes. Examples of such components include gas turbine engine blades and nozzle guide vanes. Such holes, when they are linear, may be formed by various methods such as, for example, by casting-in by means of removable cores, drilling with a conventional rotatable drill bit, laser or electron beam drilling, electro-discharge machining (EDM) and elecro-chemical machining (ECM). One such ECM method is described in GB No. 1 516 014 which describes an apparatus for forming a plurality of straight holes, the holes having non-parallel axes. The apparatus includes a guide member having the required number of holes therein, the holes in the guide member being relatively long and having their axes coaxial with the holes to be drilled or formed in the workpiece. It is a relatively simple matter to produce a long straight hole in a guide member. Straight glass capillary tubes for ECM drilling are also freely available.

The necessity arises in some component designs to produce holes having curvilinear paths. The trailing edges of gas turbine blade aerofoils which have high curvature, for example, may have such holes to assist cooling. Some of the newer aerospace materials of which oxide dispersion strengthened (ODS) alloy is one example, are not amenable to casting as a production route. Therefore, the inclusion of holes by means of cast-in, linear or otherwise, cores is not possible. In some cases drilling of holes is the preferred route even though casting-in may be technically feasible. Such cases may include those for reasons of economy or metallurgical reasons as in the case of single crystal components.

GB No. 946,448 describes a process for producing curved recesses in a metallic workpiece by EDM. The electrodes used are large and rigid and do not require additional guidance means.

Curved fine glass, capillary electrodes would be unable to be self-supporting for drilling small diameter holes in such components whilst the type of electrode guidance shown in GB No. 1 516 014 of a long curved guide member would be impractical since it is extremely difficult to form both a long curved guide member and curved glass capillary of exactly compatible curvature reliably. Problems arise due to friction between the guide member and the capillary resulting in excessive stress and consequent breakage of the capillary. Where a plurality of holes are being drilled simultaneously slight misalignments of the glass capillaries in the manifold holding them accentuate the strains and hence stresses involved.

One method which has apparently been employed to produce curvilinear holes is to flatten the aerofoil in the region where the hole is required, drill a straight hole and then bend the drilled region back into the required curve. Clearly, such techniques must in some circumstances have detrimental effects on the metallurgical properties of the alloy in a highly stressed part.

It has now been discovered that fine curvilinear holes may be formed in workpieces with curved glass capilliary electrodes without the need for a guidance member the aperture of which is coaxial with the hole to be drilled.

According to the present invention a process for the production of a curvilinear hole in a workpiece comprises the steps of producing relative motion along a curvilinear path between a workpiece in which it is desired to form the curvilinear hole and a drill bit characterised in that the drill bit comprises a curved delivery tube of an ECM apparatus and which curved tube passes through an aperture in a guidance member which is positioned adjacent the workpiece, the aperture length being less than the diameter of the tube.

In one embodiment the tube is a glass capillary tube.

Capillary electrodes in ECM apparatus are normally secured to a manifold by a curable adhesive resin. During curing of the resin stresses are generated which may result in misalignment of the intended angular direction of the electrode.

It may be shown mathematically that for a straight electrode or drill-bit which has an angular misalignment error of 'a' that when deflected and constrained to pass through the aperture of a short guide member the electrode will emerge with an angular misalignment of "$-a/2$". Most importantly as the electrode is fed through the guide member aperture the angle of emergence remains constant. This means that a straight hole is drilled and no additional undue stresses are applied to the electrode. Thus in comparison to the situation where no guide member is used, hole position at entry is nominally perfect, hole positional error at its bottom end is greatly reduced and electrode distortion and thus stresses are greatly minimised. Thus a simple short guide member, which is much easier and cheaper to manufacture than a long one, can yield a considerable improvement in performance and reliability.

The above concepts may be extended to the problem of drilling curved holes where there is a misalignment of the curved electrode relative to the intended path of the electrode. If a tangent is drawn to the point of mounting of the curved capillary, the tangent showing a misalignment of 'a' to the desired direction then it may be shown that at the exit from the aperture of a short guide member the relevant tangents show a deviation of '$-a/2$' and with continued infeed of the curved capilliary a constant curved path is obtained without further deviation. Therefore, no further undue stresses are placed on the capillary and the problem of having to produce a long curved guide member compatible with the curvature of the capillary is eliminated.

A further advantage of the short guide member is that it may readily be used to achieve specific deviations in the electrode path as distinct from merely correcting the entry point of the electrode into the workpiece to a nominal position. For example, if the required path of the electrode in the workpiece is required to lie at an angle '0' to the direction of infeed of the electrode tooling or manifold then the tooling may be designed to ensure an angle of entry into the short guide member of '$-20$'. It should be stressed that the angle '0' must be small; not greater than about 3° to 5°.

The process is not limited to the formation of holes of round cross-section but may be used interalia, for example, to form holes of oval, lozenge or rectangular section.

The cross-section of the glass capilliary corresponds to that of the hole cross-section required but of slightly reduced dimensions. The glass capilliary is formed into an arc of radius corresponding to that required for the hole to be formed.

Multiple holes may be drilled simultaneously provided that the centres of curvature for each of the holes have a substantially common axis.

In order that the present invention may be more fully understood one example of carrying out the process will now be described with reference to the accompanying drawings of which:

FIG. 2 shows schematic, part-sectioned illustration of an apparatus for drilling curved holes by an ECM technique; and.

Figure 3:
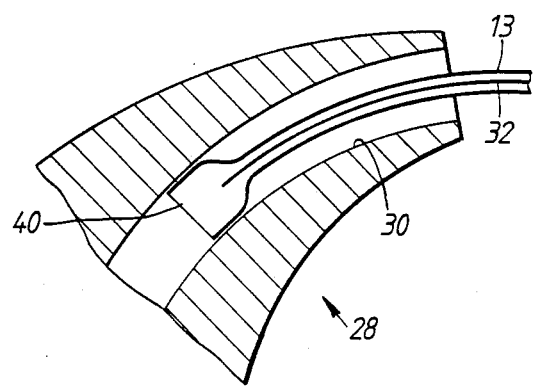
Figure 2:
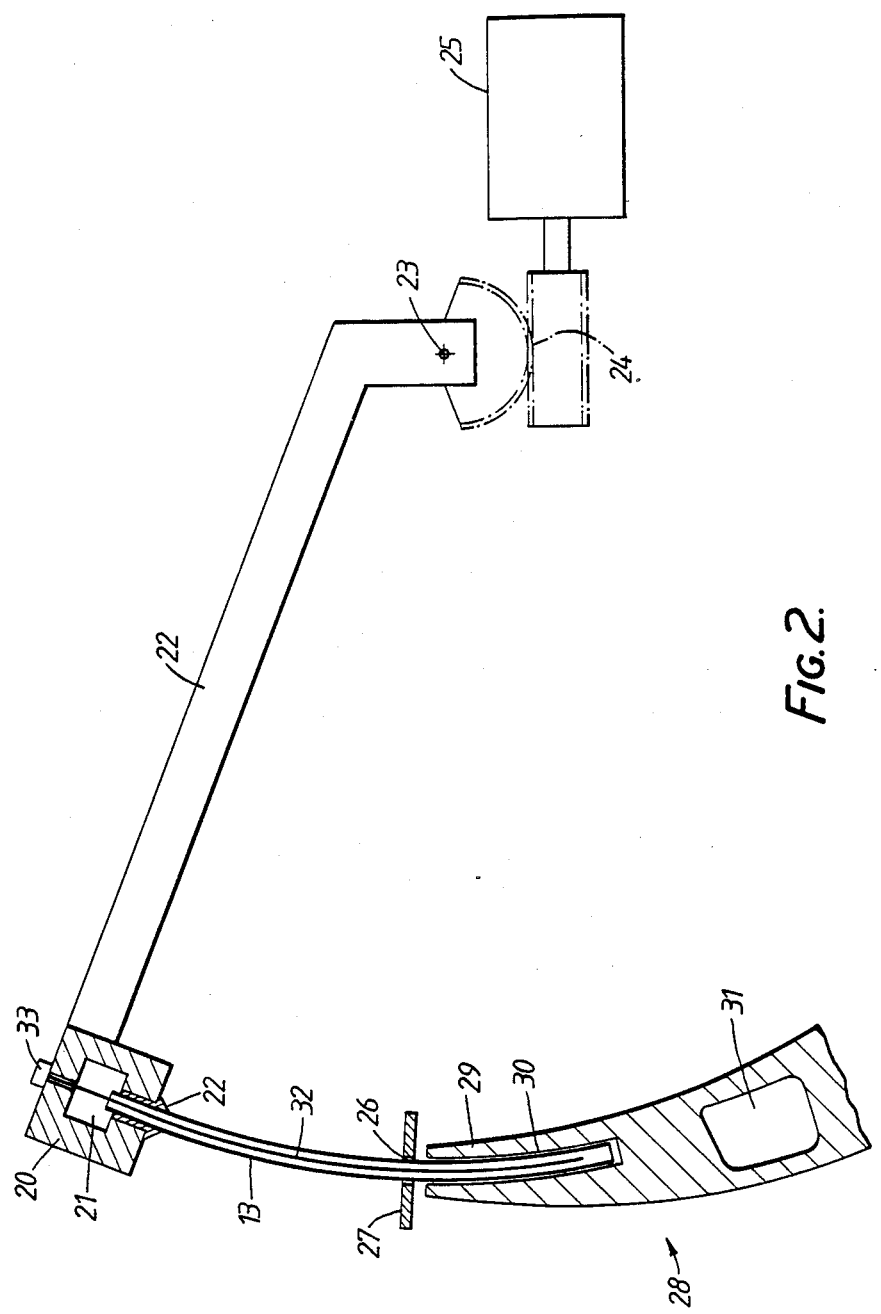

FIG. 3 which shows an alternative ECM drilling tube to that shown in FIG. 2.

Figure 1:
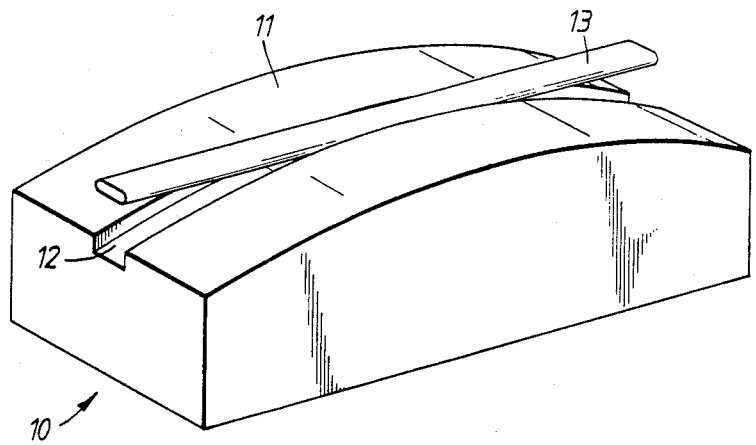
FIG. 1 shows a perspective view of a jig for the production of glass capilliary tubes of the desired radius of curvature.

Referring now to FIG. 1 and where the same features are denoted by common reference numerals. A former is shown generally at 10. The top face 11 of the former has a circular curvature corresponding, except for any relaxation allowance, to the curvature of hole required to be drilled. In the top face 11 is a groove 12 of width closely corresponding to that of the glass capilliary tube 13 to be curved. A straight tube 13 is placed in the groove 12 and the former 10 and tube 13 heated in a furnace until the tube 13 follows the curve of the top face 11 due to the effects of gravity.

In FIG. 2 the tube 13 is shown fixed into a manifold 20 having an internal conduit 21, the tube 13 being fixed into the manifold 20 by means of an epoxy or other gap-filling adhesive resin 22 and communicating with the conduit 21. The manifold 20 is connected to an arm 22 which moves about an axis 23, the tube 13 being so located that it forms an arc of a circle having its centre at 23. The arm and manifold are moved about the axis 23 by means of a worm and pinion arrangement 24 driven by a speed-controllable geared electric motor 25. The tube 13 passes through the aperture 26 of a guide member 27. The guide member 27 is short in comparison to the length of the tube 13 and of a thickness in the axial direction of the aperture 26 not exceeding the diameter of the tube 13. The aperture 26 is such that the tube 13 may freely pass therethrough without undue friction and also allow slight angular deviation, if necessary, of the tube 13 relative to the axis of the aperture 26. A workpiece is shown at 28 being in this instance a gas turbine blade having a trailing edge 29. A curved hole 30 is desired beginning at the rearmost extent of the trailing edge 29 through to an internal cooling passage 31. The tube 13 has an electrode 32 of, for example, gold, platinum or other noble metal wire passing through the tube bore and connected to an electrical terminal 33. In general the known principles of ECM are followed in that the workpiece is made anodic and the electrode 32 is made cathodic. An electrolyte which, for example, may be nitric acid is supplied under pressure from the manifold conduit 21 to the tube 13 and emerges from the end of the tube in a jet to impinge on the workpiece 28. The guide member 27 ensures that the tube 13 initially enters the workpiece in the correct position. Typical feed rates for the tube end into the workpiece may vary between about 1 and 4 mm/min depending upon the composition of the workpiece material and the processing parameters. As drilling proceeds the drilled hole 30 itself provides the tube 13 with a degree of support and guidance.

The process may be used for drilling curved holes, typically in the range of 0.25 to 3 mm in diameter. Such holes may of course be other than circular in cross-section and will depend upon the cross-sectional shape of the tube 13. Curved holes having a "race track" cross-section of 1.25 mm and 0.6 mm major and minor axis dimensions have been drilled.

Where a larger hole is desired and the tube 13 physically permits of modification the embodiment of FIG. 3 may be used. Here the tube 13 has a larger, bell-mouthed end 40 which produces a hole having the dimensions and cross-sectional shape of the bell mouth 40. Because, however, the remainder of the tube 13 is of lesser diameter it permits, if desired, of some deviation from a truly circular path of the bell-mouthed end 40. The degree of deviation permitted will depend upon the relative dimensions of the bell mouth 40 to the tube 13 diameter, the radius of curvature and the depth of the hole 30 being drilled. It will of course be necessary to mount the drilling apparatus on a table having translation capability in at least two mutually perpendicular planes preferably operated under computer control. Alternatively the use of such a drill bit may allow less demanding tolerances to be employed on the curvature of the tube 13.

Where multiple holes have to be drilled, as is frequently the case with turbine components such as blades, then provided that all the holes have the same radius of curvature and substantially the same effective axis of rotation many holes may be drilled simultaneously by providing the manifold 20 with the requisite number of tubes 13. Components have been drilled with both 9 and 18 holes simultaneously.

Although the invention has been described with reference to the use of an ECM technique EDM may be employed. With EDM, however, the need for accurate electrode radiussing and alignment of the centres of radius become more critical because of the presence of the uninsulated electrode.

The invention has been described with respect to the production of curved holes in components for gas turbine engines; it is, however, equally applicable to the production of such holes in any engineering component. Examples of such components may include dies, valve blocks, components having channels for lubricants or other hydraulic or pneumatic equipment.

Furthermore the process of the invention may be employed in the drilling of curvilinear holes in ceramics by means of ultrasonic techniques. In such techniques an abrasive tip is mounted on an ultrasonic transducer and an abrasive slurry is fed to the tip whilst it is advanced into the workpiece. The ultrasonic transducer and tip may be formed into the arc of a circle and the process of the present invention employed.

I claim:

1. A process for the production of a curvinlinear hole in a workpiece, the process comprising the steps of producing relative motion along a curvilinear path between a workpiece in which it is desired to form the curvilinear hole and a drill bit wherein said drill bit is a glass capillary tube and comprises a curved delivery tube of an ECM apparatus and which curved tube passes through an aperture in a guidance member which is positioned adjacent the workpiece, the aperture length being less than the diameter of the tube.

2. A process according to claim 1 wherein said delivery tube is of non-circular cross-section.

3. A process according to claim 1 wherein said drill bit has a bell-mouthed end.

4. A process according to claim 1 wherein said workpiece is a gas turbine engine component.

5. A process for the production of curvilinear holes in at least one workpiece, the process comprising the steps of producing relative motion along a curvilinear path simultaneously between at least one workpiece in which it is desired to form the curvilinear holes and a plurality of drill bits so that multiple holes are drilled simultaneously, wherein each said drill bit comprises a curved delivery tube of an ECM apparatus and which curved tube passes through an aperture in a guidance member which is positioned adjacent the at least one workpiece, the aperture length being less than the diameter of the tube.

6. A process for the production of a curvilinear hole in a workpiece, the process comprising the steps of producing relative motion along a curvilinear path between a workpiece in which it is desired to form the curvilinear hole and a drill bit wherein said drill bit comprises a curved delivery tube of an ECM apparatus and which curved tube passes through an aperture in a guidance member which is positioned adjacent the workpiece, said hole being in the range from 0.25 mm to 3 mm cross section, and the aperture length being less than the diameter of the tube.

* * * * *